UNITED STATES PATENT OFFICE.

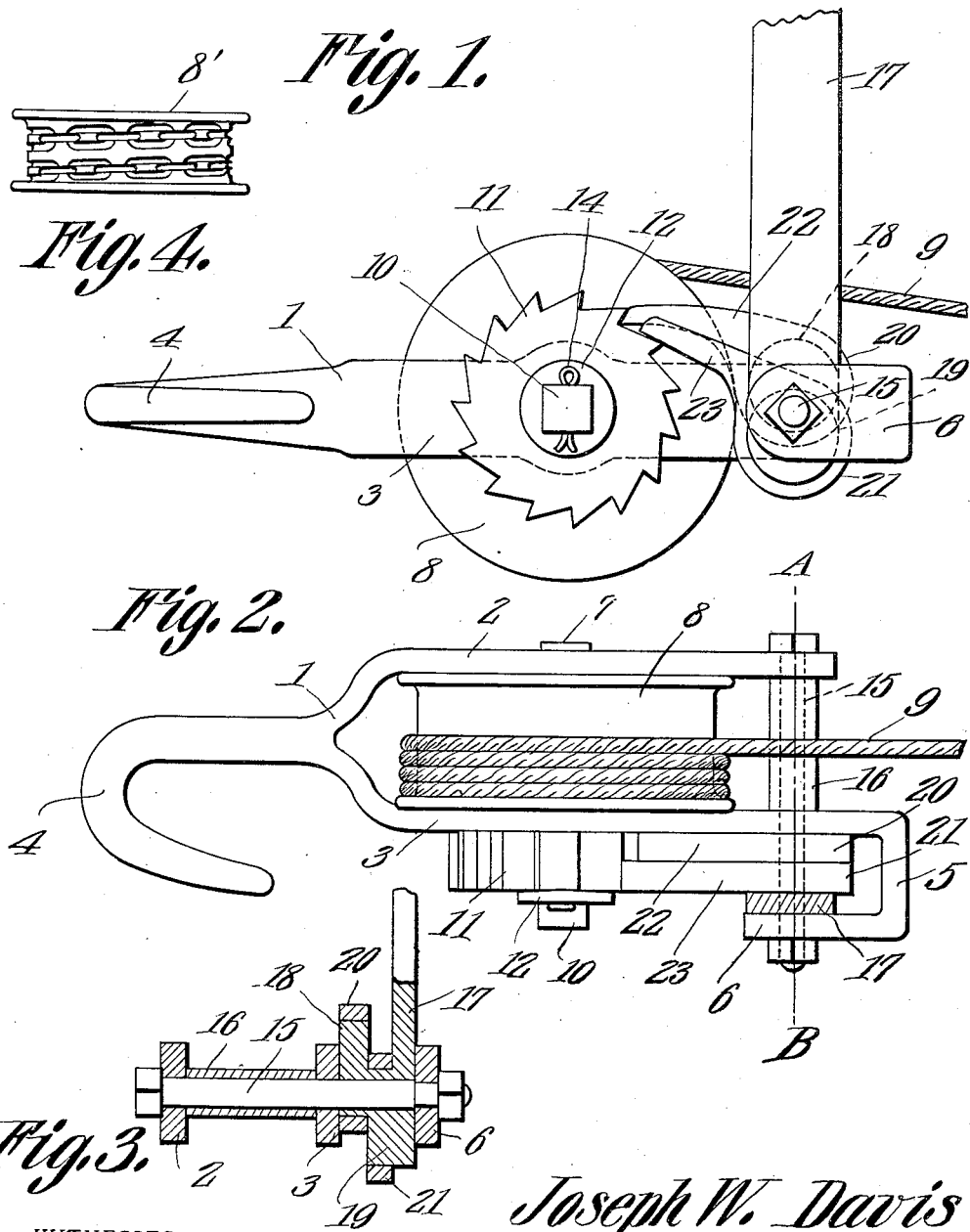

JOSEPH W. DAVIS, OF CONCORDIA, KANSAS.

SNATCH-BLOCK.

1,017,652. Specification of Letters Patent. Patented Feb. 20, 1912.

Application filed April 22, 1911. Serial No. 622,737.

*To all whom it may concern:*

Be it known that I, JOSEPH W. DAVIS, a citizen of the United States, residing at Concordia, in the county of Cloud and State of Kansas, have invented a new and useful Snatch-Block, of which the following is a specification.

It is the object of the present invention to provide novel means for actuating the drum of a block, to wind in the flexible member which is upon the drum.

Specifically, it is the object of the present invention to provide a novel form of pawl and ratchet mechanism, whereby rotation may be imparted to the winding drum of a block, or other similar structure.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in side elevation; Fig. 2 is a top plan; Fig. 3 is a section upon the line A—B of Fig. 2; and Fig. 4 is an elevation showing a modified form of wheel which may be introduced into the structure.

In carrying out the invention there is provided, as a primary and fundamental element, an arched body 1, having arms 2 and 3, the body 1 terminating in a hook 4. The arm 3 is back-bent upon itself, as shown at 5, to form a supplemental arm 6.

Journaled for rotation in the arms 2 and 3, is a main shaft 7, to which is secured, between the arms 2 and 3, a drum 8, upon which the line 9 is adapted to be wound. One end of the shaft 7 is squared, as shown at 10, this squared end 10 protruding through the arm 3. Mounted upon the squared end 10 of the shaft 7, is a ratchet wheel 11, located upon the outside of the arm 3. If desired, a washer 12 may be placed against the ratchet wheel 11, the washer 12 and the ratchet wheel 11 being maintained in place upon the squared end 10 of the shaft 7 by means of a cotter pin 14, or any other equivalent structure.

Extended through the arms 2 and 3, and through the supplemental arm 6, as seen most clearly in Fig. 3, is a shaft 15, the shaft 15 being, if desired, a simple bolt and nut structure, carrying a collar 16, located between the arms 2 and 3. Fulcrumed upon the member 15, and located between the arms 3 and 6, is an operating lever 17, having, upon one side, integrally formed eccentrics 18 and 19, carrying straps 20 and 21, respectively. Formed integrally with the strap 20 is a pawl 22, and formed integrally with the strap 21, is a pawl 23. The pawls 22 and 23 are adapted to engage the ratchet wheel 11, but the eccentrics 18 and 19 are so disposed that the pawls 22 and 23 do not engage simultaneously, with the same tooth of the ratchet wheel 11.

In practical operation, the operating lever 17 is rocked to and fro, the eccentrics 18 and 19 operating the straps 20 and 21, respectively, the straps 20 and 21, in their turn, operating the pawls 22 and 23 respectively, and alternately, whereby through the successive engagement between the pawls 22 and 23 and the teeth of the ratchet wheel 11, a step by step rotation will be imparted to the ratchet wheel 11, to the main shaft 7, and ultimately to the drum 8, thereby reeling in the line 9.

In the room of the wheel 8, the chain wheel 8' of Fig. 4 may be employed, Fig. 4 serving to illustrate the fact that the device may be altered to receive any sort of a flexible element.

Having thus described the invention what is claimed is:—

In a device of the class described, a body comprising spaced main arms, one of the main arms being back-bent upon itself to form a supplemental arm; a shaft journaled for rotation in the main arms; a drum secured to the shaft, between the main arms; a ratchet wheel secured to the shaft upon the outside of one of the main arms; a shaft mounted in the main arms and in the supplemental arm; a lever fulcrumed upon the last named shaft, between the supplemental arm and the adjacent main arm, the lever being provided with eccentrics; straps surrounding the eccentrics, the straps carrying pawls adapted to engage the ratchet wheel successively, when the lever is manipulated.

In testimony that I claim the foregoing as my own, I have hereto affixed my signature in the presence of two witnesses.

JOSEPH W. DAVIS.

Witnesses:
R. A. SHORT,
AMY C. LADD.